(12) United States Patent
Goldberg et al.

(10) Patent No.: US 6,760,696 B1
(45) Date of Patent: Jul. 6, 2004

(54) FAST START VOICE RECORDING AND PLAYBACK ON A DIGITAL DEVICE

(75) Inventors: Jossef Goldberg, Seattle, WA (US); Jeffrey R. Blum, Seattle, WA (US); Charlton E. Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/283,224

(22) Filed: Apr. 1, 1999

Related U.S. Application Data

(63) Continuation-in-part of application No. 09/003,994, filed on Jan. 7, 1998.

(51) Int. Cl.[7] ............................. G10L 19/00; G10L 21/00
(52) U.S. Cl. ........................................ 704/201; 704/270
(58) Field of Search .................................. 704/201, 270, 704/500; 369/25, 29.02, 25.01; 700/94; 713/1, 2, 100, 300, 323, 324

(56) References Cited

U.S. PATENT DOCUMENTS

| | | | | |
|---|---|---|---|---|
| 5,491,774 A | * | 2/1996 | Norris et al. | 704/270 |
| 5,768,126 A | * | 6/1998 | Frederick | 700/94 |
| 5,812,129 A | * | 9/1998 | Kacor et al. | 345/339 |
| 5,875,448 A | * | 2/1999 | Boys et al. | 707/531 |
| 6,038,199 A | * | 3/2000 | Pawlowski et al. | 369/29.02 |

FOREIGN PATENT DOCUMENTS

| | | |
|---|---|---|
| EP | 0726518 A2 | 8/1996 |
| EP | 0 726 518 A2 * | 8/1996 |
| WO | 95/28711 * | 10/1995 |

* cited by examiner

*Primary Examiner*—Richemond Dorvil
*Assistant Examiner*—Angela Armstrong
(74) *Attorney, Agent, or Firm*—Ronald M. Anderson

(57) ABSTRACT

Voice recording is initiated immediately upon pressing a record button on a digital computing device such as a palm computer. To enable an immediate response to the button being pressed without a delay that would be normally be incurred to load a user interface and a recording application, a stub program is continuously executed on the device, even when a main user interface program is not running. When the record button is pressed, the stub program immediately begins recording a digital signal corresponding to the sound waves incident on a microphone of the device in a compressed format. If the record button is depressed for more than a second, the recorded digital signal is stored in a file so that it can subsequently be played back, and if the record button was pressed for less than one second, the file is not retained. Sound recording can be initiated in an "eyes free" mode, e.g., while using the device under low ambient light conditions, or while engaged in another activity. Recording and playback are controlled by a user interface that is launched when the record button is initially pressed, if not already running. Sound files can be selected and played back at either a normal speed or at a substantially higher speed without any significant change in the frequency of the recorded sound, using control buttons provided on the hand held computing device or the user interface that is provided on a touch screen display.

45 Claims, 5 Drawing Sheets

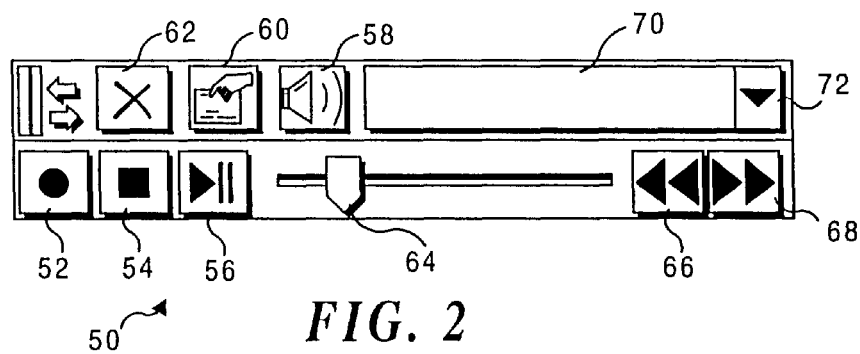
*FIG. 2*
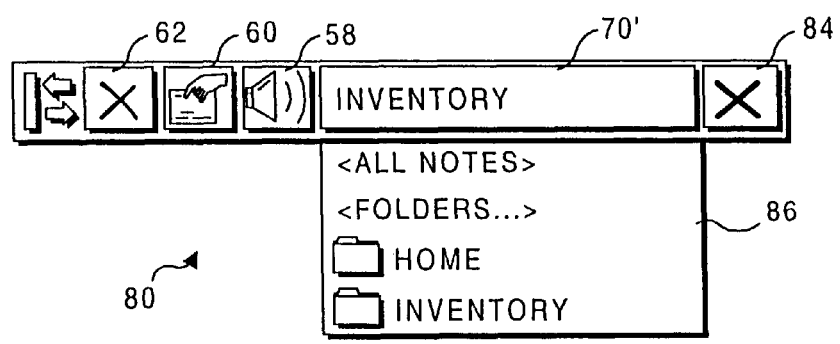
*FIG. 3*
*FIG. 4*

FAST START VOICE RECORDING AND PLAYBACK ON A DIGITAL DEVICE

RELATED APPLICATION

This application is a continuation-in-part of prior copending patent application Ser. No. 09/003,994, filed Jan. 7, 1998, priority in the filing date of which is hereby claimed under 35 United States Code Section 120.

FIELD OF THE INVENTION

The present invention generally relates to a portable digital computing device for use in storing and accessing data, and more specifically, to a digital computing device provided with an alternative to a user interface display screen to control applications executing on the device.

BACKGROUND OF THE INVENTION

Portable computing devices ranging in size from credit card sized personal data assistants to laptop computers have become increasingly popular for use by business people and others who must travel about and thus cannot readily access information stored on their desktop computer or office network workstation. Although laptop computers are capable of running virtually all of the application programs that execute on desktop machines, they often weigh more than seven pounds and cannot be readily carried about in a pocket or purse. There is thus an increased demand for substantially smaller palm type computers that are able to run business applications of less complexity than those designed to run on a desktop computer and which enable a user to quickly access all types of personal and business related data, such as addresses, telephone numbers, scheduled appointment times, etc.

More recently, another type of portable computer has been developed that is intended to be used in automobiles, e.g., integrated with an entertainment sound system of the vehicle. Because of its use in an automobile, such devices are sometimes referred to as an "AutoPC." Since a driver of a vehicle is not free to operate a conventional keyboard, touch screen, or other interface devices requiring substantial attention, these automotive portable computers are being provided with voice recognition control capability.

Computers are also being developed that are specifically adapted for installation in appliances. Compared to conventional firmware programmed controls or programmable logic devices, these new appliance computers will provide greater versatility and will interface with users in new ways that are currently not possible. For example, an appliance computer may allow a user to define a dishwashing cycle by speaking the options to the computer.

It will thus be apparent that newer types of portable computers, automobile computers, and appliance computers will not employ full conventional keyboards for control and entry of data into the computer. Although laptop computers usually include a keyboard sufficiently large to enable relatively efficient text entry, smaller palm type computers usually do not. If a keyboard is provided on such machines, it is typically too small to permit touch typing. Text entry may be available only through a touch screen that displays a reduced-size representation of a keyboard, permitting characters to be entered with a stylus, a carefully positioned finger, or another small diameter pointing object. As a further alternative, handwriting recognition can be used on a small computing device for entry of data and for control input. However, it would be preferable to provide an alternative technique to enter information that does not require the user to use a keyboard or a stylus to write on a screen. Voice recognition offers one such solution to this problem.

Even if a keyboard is provided on a computing device that is sufficiently large to enable a user to enter text efficiently by hand, the touch typing text entry process requires both hands and requires both eye/finger coordination, and substantial attention to the process. Thus, it is not possible to safely drive a vehicle while typing an entry on a computer keyboard, and regardless of the technique used, it would likely be safer to pull over and stop the car while the driver deals with the desired computing task. There are many other occasions when a person simply wants to enter a quick memo or reminder of some event, or make note of information. These occasions may occur, for example, while talking to someone on a phone. At such times, entry of the text on a small touch screen display keyboard or even on the relatively larger keyboard of a notebook computer may not be practical. Instead, it would be preferable to enable the user to make a recording of the verbal information, thereby eliminating the need to enter it as text, via a keyboard. Although portable, hand held analog or digital recorders are currently available, it would be preferable to provide the voice recording capability on a portable, automotive, or appliance computing device that also stores other types of data and is capable of running useful application programs, so the user need not carry about both a dedicated recorder and a digital computing device.

If a digital voice recording capability is provided in a hand held digital computing device, one potential problem or annoyance may be the time delay required to start recording a note. Hand held digital computing devices typically have a limited amount of memory and often use slower and less powerful processors than desktop computers. Accordingly, it is likely that the delay required to launch a user interface (UI) from which a voice recording application can be started would be unacceptable to most people. The time required to boot up a hand held computing device and select a voice recording option could easily be 5 seconds or more. An individual who wants to record a thought or make note of information that is being provided by another person would not want to wait that long before starting to record the data. Instead, it is important to enable the voice recording to start immediately, for example, so that the user need only push a button and begin speaking, even if the digital computing device has not previously been used and the UI is not available to execute a voice recording application.

Also, the user should be able to initiate the voice recording operation in an "eyes free" mode, by pushing a predefined control button on the device, which can be identified and actuated solely by feel and location on the computing device. The sound recording function will then be immediately usable at any time, will be operable with one hand, and will be usable under low light conditions and while engaging in other activities such as talking on the telephone or driving a vehicle. This feature would also be employed with other applications or functions that must be started immediately without requiring the user to first launch a UI on a display screen of the hand held computing device, and without requiring the user to see the device in order to run the application.

SUMMARY OF THE INVENTION

The present invention is directed to a digital computing device that immediately implements a predefined function in response to a user action, independent of whether a main user interface is currently running on the digital computing device. Included is a power supply for providing electrical power to energize the device. A memory is provided for storing machine instructions. Disposed on the housing for use in selectively causing the device to carry out a predefined function is a switch, so that the switch is readily actuated by the user. A processor is coupled to the memory and to the switch and executes the machine instructions to carry out a plurality of functions. A portion of the machine instructions comprises a stub program that typically runs continually (or at least until the power supply is de-energized), and another portion of the machine instructions comprises a main program that is substantially larger than the stub program. The main program is selectively executed by the processor to provide the main user interface, while the stub program is adapted to immediately respond to a user actuating the switch by implementing the predefined function, even when the main program is not currently running and the main user interface is thus not currently available.

If the main program is not yet running, the stub program is adapted to cause the processor to launch the main program in response to the user actuating the switch. In the preferred application of the present invention, a microphone that produces an analog signal corresponding to sound waves that are incident on the microphone is also included. An analog-to-digital (A/D) converter is coupled to the microphone and to the memory and is employed for converting the analog signal produced by the microphone into a digital signal that is stored in the memory. The predefined function then comprises storing the digital signal from the A/D converter in the memory to record the sound waves that are incident on the microphone.

The stub program is adapted to cause the processor to at least temporarily store the digital signal in the memory until the user stops actuating the switch. However, the stub program causes the processor not to save the digital signal if the user actuates the switch for less than a predefined interval. In this case, the stub program causes the processor to launch the main program and discards the digital signal that was held in the memory. In addition, the stub program preferably further compresses the digital signal and saves the digital signal in the memory in a compressed format, so that less memory is required for storing such data than would be required to stored the digital signal uncompressed.

Preferably, the hand held digital computing device also includes a sound transducer that produces audible sounds in response to an applied analog signal, and a digital-to-analog (D/A) converter that is coupled to the memory to receive the digital signal stored therein and produce the applied analog signal that is input to the sound transducer. The applied analog signal input to the sound transducer causes it to produce audible sounds corresponding to the digital signal to play back the sounds that were stored.

The main program (or an application program that runs under the main program) includes functions for controlling the playback of the digital signal stored in the memory. These functions are controlled using a plurality of controls adapted to be actuated by the user. Included is a control for initiating the playback of the digital signal stored in the memory to produce the sound waves that were incident on the microphone. Also, one of the plurality of controls is adapted to cause the playback of the digital signal at a speed substantially greater than a rate at which the digital signal was provided to the memory by the A/D converter, i.e., at a fast forward rate.

The digital signal stored in memory is preferably divided into discrete segments or notes. The control that causes the fast forward can be held closed in one position for less than a predefined time interval (i.e., tapped) while one segment is playing to immediately start playing the next segment or note of the stored digital signal. If the control is held depressed for longer than the predefined time interval, it causes the device to fast forward through the digital signal of the segment currently being played.

Still another of the plurality of controls is adapted to move back through the digital signal stored in the memory when continuously actuated by the user, in a manner analogous to selectively rewinding through the stored digital signal. The duration of the portion thus "rewound" is preferably greater than the time that the control is actuated during the rewind operation. During the rewind process, an audible tone is produced to indicate increments of time corresponding to an extent of reversing through the stored digital signal. The control that causes the fast rewind can be held closed for less than a predefined time interval (i.e., tapped) while one segment or note is playing to immediately start playing the previous segment or note of the stored digital signal.

Further, the machine instructions cause the processor to store the digital signal as a file, in a folder specified by the user. The user can preferably identify the folder by speaking its name into the microphone.

A data port adapted for transmitting the file to another computing device may also be included, so that the digital signal stored in a file can be transferred to the other computing device, e.g., to a personal computer. Further, the main program is preferably adapted to enable the user to record words spoken with the microphone, for inclusion in an e-mail message, or as part of a personal information management program "note" entry, or in any appropriate application to which the user has set the "focus."

Another aspect of the present invention is directed to a method for immediately implementing a predefined function in response to a user action on a hand held digital computing device, independent of whether a main user interface is currently running on the hand held digital computing device. The steps of the method are generally consistent with the functions discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2 illustrates a main command button bar provided by the user interface that is displayed on a touch screen of the portable hand held computer shown in FIGS. 1A and 1B;

FIG. 3 illustrates a list view button bar provided in the user interface of the hand held computer;

FIG. 4 illustrates a display window provided on the hand held computer in which are listed exemplary recorded files that are stored on a personal computer memory card international association (PCMCIA) (or simply "PC") card, which is connected to the hand held computer;

DESCRIPTION OF THE PREFERRED EMBODIMENT

Hand Held Computing Device

Figure 1A:
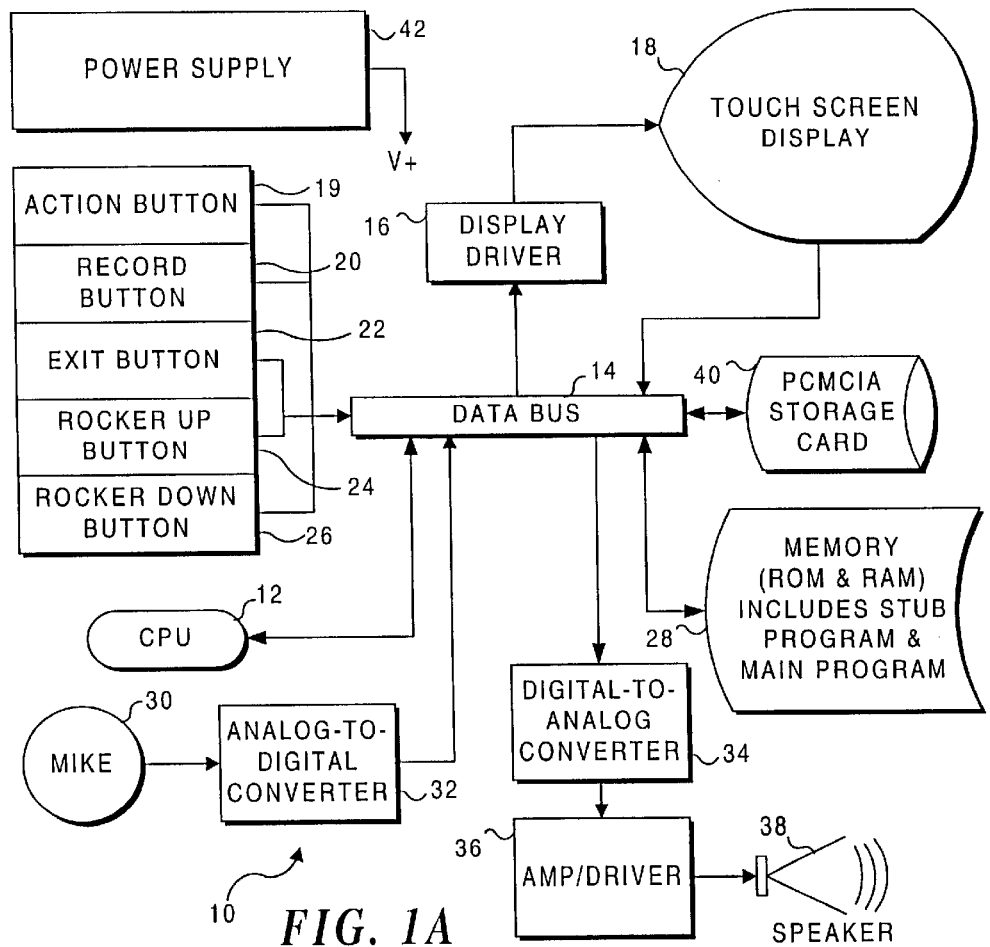
FIG. 1A is a block diagram showing functional components of a portable hand held computer that implements the present invention.
Figure 1B:
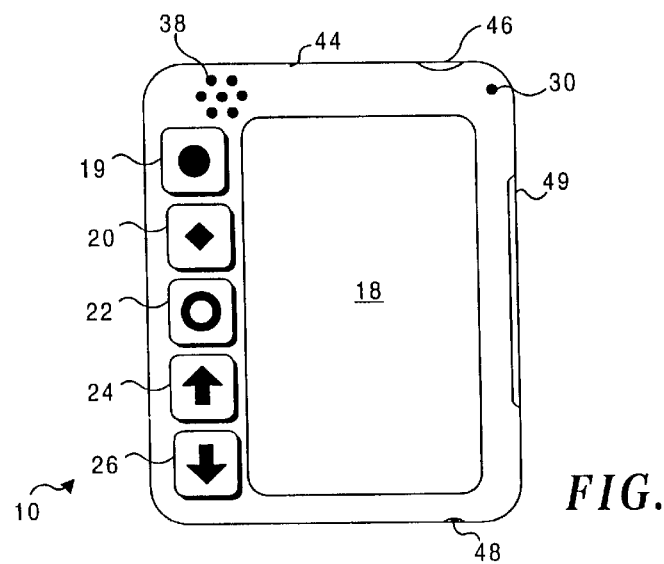
FIG. 1B is a schematic top view of the portable, hand held computer of FIG. 1A.

Although the present invention is not limited in its application to a palm type computer or to a hand held personal computer, it will initially be used in such devices. However, the invention is also applicable to automobile computers, appliance computers, and other small computing devices. One preferred embodiment of the present invention is directed toward the fast start of a voice recording on a hand held digital computer, enabling the computer to be used for recording memos, notes, and other sound data. A schematic block diagram of the components comprising a hand held digital computer 10 that implements the present invention is shown in FIG. 1A; FIG. 1B shows further physical details of an exemplary embodiment for such a device.

Referring now to FIGS. 1A and 1B as appropriate, it will be noted that hand held digital computer 10 includes a central processing unit (CPU) 12, which implements machine language instructions to carry out various functions performed by the device. These machine language instructions are stored in a memory 28, which is bidirectionally coupled to CPU 12 through a databus 14. Alternatively, the databus may be omitted if the components shown coupled through the databus are instead directly coupled together. The machine instructions that execute on CPU 12 are divided into a relatively small subset referred to as a stub program (e.g., a program of about 10 Kbytes) and a substantially larger subset (typically substantially more than 100 Kbytes) that is employed for implementing a user interface and for running selected applications on hand held digital computer 10. The user interface is presented on a touch screen display 18, which is coupled to databus 14 through a display driver 16, which produces the signals required to create the user interface display screens and touch controls. When the user touches touch screen display 18, it responds by producing a signal corresponding to the relative x, y position on the screen that is preferably input to CPU 12 through databus 14. Accordingly, a main menu that is part of the user interface that appears on touch screen display 18 enables the user to select various options, including launching and controlling applications executed by CPU 12. Although not shown, the main user interface preferably includes the display of a touch screen keyboard that replicates the keys found on a conventional keyboard for a personal computer, but is preferably activated with a stylus or a finger of one hand (due to its relatively small size).

Five hardware control buttons or switches are provided for controlling hand held digital computer 10. The control buttons are disposed to the left of touch screen display 18 and are mounted on the upper surface of a housing 44 so that they are readily accessible and can be actuated by the fingers of the hand holding the housing. It will be appreciated that the control buttons can be disposed in entirely different locations, as desired or to work more efficiently with a different shape or configuration of the housing.

The first of these control buttons is an action button 19 having a function that generally corresponds to that provided by the enter key on a conventional keyboard or that provided by selecting "OK" in a dialog box. Below the action button is a record button 20, which is used to initiate immediate recording of sound, as explained below. An exit button 22 performs a function analogous to the escape key provided on a conventional personal computer keyboard. A rocker up button 24 and a rocker down button 26 are also provided, and these buttons perform functions that are generally analogous, respectively, to the up and down keys used on a conventional personal computer keyboard to move a caret or selection point respectively up and down in the display, in addition to providing other control functions, as explained below.

Sound Recording and Play

To enable sound recording on hand held digital computer 10, a microphone 30 is provided within the housing, appearing at the upper right corner of the device as illustrated in FIG. 1B. The output signal from microphone 30 is an analog signal characterized by frequencies and amplitudes corresponding to the frequencies and amplitudes of the sound pressure waves that are incident on the microphone. An A/D converter 32 converts the analog signal produced by microphone 30 into a corresponding digital signal that is applied to databus 14 for processing by CPU 12.

The digital signal that is output from A/D converter 32 is preferably compressed by the CPU before being stored in memory 28. The compression algorithm that is used in a preferred embodiment is provided by Hewlett-Packard Corporation and is referred to as the MOBILE VOICE compression routine; however, it should be apparent that other compression schemes (or none) can alternatively be used. The MOBILE VOICE routine is a parametric coder, i.e., a model of speech production is used to analyze the uncompressed digital signal, and only the resulting model parameters (comprising a compressed digital signal) are stored. This routine yields a very low bit rate and requires only moderate computation, but requires a good fit between the speech model and the input speech. The required fit to the model is best achieved when the user speaks clearly, close to the microphone. The model is an enhanced version of the well-known linear predictive coding (LPC) system, employing ten coefficients as parameters that describe the speaker's vocal-tract shape and voice pitch, and a flag to indicate if the speech is voiced or unvoiced. Using the MOBILE VOICE compression routine, the compressed digital signal is stored in memory 28 at the rate of about 300 bytes per second, which corresponds to a rate of approximately 8000 bytes per second for the uncompressed digital signal output from A/D converter 32. Approximately one kilobyte of recorded sound in the compressed format is saved in memory 28 each 3.3 seconds of recording time. The compressed digital signal that is stored in memory 28 can alternatively be directly stored in a PCMCIA storage card 40, which is connected to hand held digital computer 10 by insertion into a PC card slot 49 (shown in FIG. 1B).

To play back a recorded sound file, the compressed digital signal is uncompressed by CPU 12 using an inverse of the compression procedure employed to create the compressed digital signal, and the resulting uncompressed signal is applied to the input of a D/A converter 34, which converts the digital signal after it is uncompressed into a corresponding analog signal. This analog signal is applied to the input of an amplifier/driver module 36, which produces a driving signal for a speaker 38. Speaker 38 is shown in FIG. 1B disposed at the upper left corner of housing 44, but it can be located at other positions on the housing. It should also be noted that headphones or an earphone may also be employed for listening to the sound if connected to the device through an appropriate mini phone jack (not shown) that is mounted on housing 44.

A power supply 42 provides the required voltages for each of the active elements on hand held digital computing device 10. Although only a single voltage line is illustrated in FIG. 1A, it will be understood that different voltages required by the active components of the device are supplied by power supply 42, which preferably includes a battery (not separately shown). The battery can be coupled to an AC line (not shown) for recharging.

Hand held digital computer 10 preferably includes an infrared port 46 (also referred to as an infrared data access (IRDA) port) that enables bidirectional transfer of files between the device and a personal computer or another hand held computer that is provided with a corresponding infrared port. Since such ports are well known in the prior art, details of the port need not be included in the present disclosure.

A primary feature of the present invention is its ability to immediately initiate sound recording when the user depresses record button 20 regardless of whether the user interface is currently being executed by CPU 12. To respond to the depression of record button 20 for starting immediate voice recording, the stub program stored in memory 28 remains active at all times, even when the main program is not being executed by CPU 12. When the main program is not running, touch screen display 18 appears blank, and hand held digital computer 10 appears to be inactive. However, so long as power supply 42 is energizing the required components in the hand held computer, and assuming that the stub program has been initiated after power was applied to the components, the device remains ready to immediately start recording voice or other sounds that are incident on microphone 30 in response to the user depressing record button 20. The user is not required to wait until the main user interface is launched and/or until a sound recording application is executed, but instead can immediately begin recording with the hand held computer.

If the main program is already being executed by CPU 12 so that the user interface is running, touch screen display 18 displays a record/play toolbar 50, generally as shown in FIG. 2. Record/play toolbar 50 includes a record control 52, which when touched by the user, provides an alternative way to initiate the recording of sound waves incident on microphone 30. It should be noted that record/play toolbar 50 is a graphic image that defines control zones on the touch screen display to which the CPU responds if any such control zone is actuated with a stylus or finger. A stop control 54 is also provided on record/play toolbar 50, for use in stopping the recording of sound. By actuating record control 52, the user can selectively record a sound file. The record control is preferably employed (instead of the record button 20) to record sound for an extended period of time, e.g., conversations occurring during an extended meeting. The recording time is limited only by the amount of memory available on the device. By using record/play toolbar 50 to initiate the recording of a meeting, the user is not required to hold record button 20 depressed during the entire time interval that sound is being recorded.

The user interface can also be employed for recording a sound file for inclusion in an E-mail message. The E-mail message can be initiated, and the sound file recorded by employing the user interface controls or the record button. The sound file then becomes a part of (or an attachment to) the E-mail message. Alternatively, a previously recorded sound file can be attached to an E-mail message.

A rewind control 66 can be selected to back up through a sound recording by approximately two seconds each time the control is actuated. Play continues from the new position in the file if the control is actuated while a file or note is playing.

It is also possible to use rocker up button 24 for rewinding through a file that is being played. The rocker up button can be actuated (if actuated for more than a minimum predefined interval of time) to rewind back through the sound recording by approximately 500 milliseconds at a time, repeating while the button remains depressed. Each 500 milliseconds of rewind time corresponds to about two seconds of actual recorded sound. For every 500 milliseconds of rewind time, a "beep" sound is produced through speaker 38 (see FIG. 1B), thereby providing an audible indication for each successive rewind interval. However, if the rocker up button is depressed for less than the minimum predefined interval of time (i.e., if it is tapped) while a file or note is playing, it causes the previous file or note to be played (if any "previous file or note" is stored in the memory).

A forward control 68 performs a function analogous to that of rewind control 66, skipping forward in a sound file by approximately two seconds each time that the control is actuated (i.e., tapped) while a file or note is NOT playing. If control 68 is actuated while a file is playing, the control remains depressed and causes the file to play at a fast play speed until the control is tapped again. The fast play speed is equal to approximately 1.5 to 2 times the normal play speed. However, the frequency of the sound produced during the fast play speed is not substantially different than the normal play speed, i.e., it does not sound unusual, other than playing faster. As soon as forward control 68 is tapped again during fast play speed, normal play speed is resumed and control 68 appears to pop back up when released.

Alternatively, fast play speed can be selected using rocker down button 26. If rocker down button 26 is held depressed during the playing of a file (for more than a minimum predefined interval of time), the same fast play speed is achieved while the control button remains depressed. Play at normal speed resumes when the rocker down control button is released. However, if the rocker down button is simply tapped while one file is playing, so that the rocker down button remains closed for less than the minimum predefined interval of time, the next file or recorded note begins playing (assuming that there is a "next file" stored in memory). Forward control 68 appears to be depressed on touch screen display 18 while rocker down button 26 is depressed.

A slider 64 is provided to indicate the relative position in a sound file; the slider operates differently depending upon whether the user is recording a note or file or is playing back a previously recorded note or file. During recording, the full slider travel length indicates a total time of 15 seconds and the current timing as the slider moves from left to right while the file is being recorded. If the user continues to record beyond the 15 seconds time, the slider restarts at the beginning (to the left) after it reaches the end of its travel (at the right); it repeats this action for successive 15 second intervals. During playback of a sound file, the total length of the track along which the slider travels represents the duration of the file that is being played, and the position of slider 64 between the left and right extreme ends of the track indicates the relative current point in the sound file.

Record/play toolbar 50 also includes a play/pause control 56, which is used for playing recorded sound files and pausing during the playback. A volume control 58 can be selected to display a volume control 130, as shown in FIG. 7.

Figure 7:
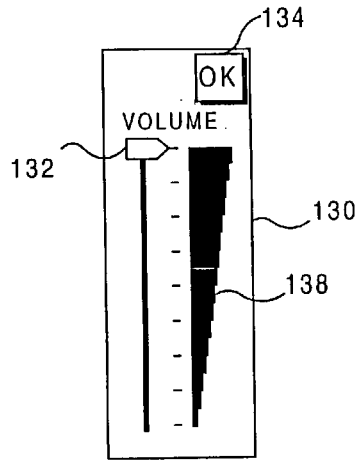
FIG. 7 is a volume slider control for setting the speaker volume on the hand held computer.

Referring to FIG. 7, volume control 130 includes a slider 132 that the user can touch and move upwardly or downwardly to select a relative volume for the audible sound during playback. A plurality of bars 138 indicate the relative playback volume, i.e., shorter bars adjacent to the position of slider 132 indicate that the volume is decreased, while if the slider is moved adjacent to relatively longer bars, a louder playback volume is provided. An OK control option 134 is selected to dismiss the volume control dialog.

Storing Sound Files in Folders

Referring back to FIG. 2, a control 60 can be tapped on the touch screen display to list the properties of a selected file listed in a box 70. To delete a file or folder, a delete control 62 is included on record/play toolbar 50. Box 70 lists a current folder, but additional folders can be displayed (if they exist) by selecting a drop-down list control 72. When this control is selected, a toolbar 80 is illustrated, as shown in FIG. 3. In this Figure, a drop-down list window 70' displays a selected folder name INVENTORY, which is also included as the bottom entry of a drop-down list 86. Additional entries include "ALL NOTES" corresponding to a listing of all of the recorded sound files, "FOLDERS . . . " corresponding to a list of all of the folders, and the folder named "HOME." Recorded sound files can be transferred to another computer such as a desktop personal computer by transmission through either a conventional serial port or via the infrared port provided on the hand held computer.

If the user selects ALL NOTES option in the list box, then all of the notes that are resident in the folder "MY DOCUMENTS," including those one subdirectory deep, are displayed. It should be noted that in the current preferred embodiment, only the concept of "projects" exists, not the concept of directories. If a file has not been assigned to a selected project, then it is assigned to a default project "ALL." Toolbar 80 also includes volume control 58, control 60, and delete control 62. A cancel control 84 can be selected if the user does not want to proceed with selecting a file or folder from the drop down listing.

In FIG. 4, an exemplary sound file listing includes three notes that have been recorded and are stored. Specifically, a dialog window 90 lists notes named "Hot Tip," "Mongoose," and "Lightning" under a column heading 92. In addition, a column heading 94 indicates the date and time at which each of these notes was recorded, while a column heading 96 indicates the duration in seconds of each note. At the bottom of this Figure, a status box 98 indicates whether a file is currently being recorded or a sound file is being played and gives an indication of the signal strength, i.e., either a recording level or a playback level. A block 100 indicates the length and current time position in the file. In the example shown in FIG. 4, a file being played back has played through five seconds of its total 20 second duration. When recording, block 100 indicates the time lapsed since the current recording was started, for example, "8 S" indicates that eight seconds of recording have been completed. A block 102 states how many seconds remain available for recording sound files as a function of the available memory on the hand held digital computer. In the example shown, 189 seconds remain free for recording one or more sound files.

Setting Options

Figure 5:
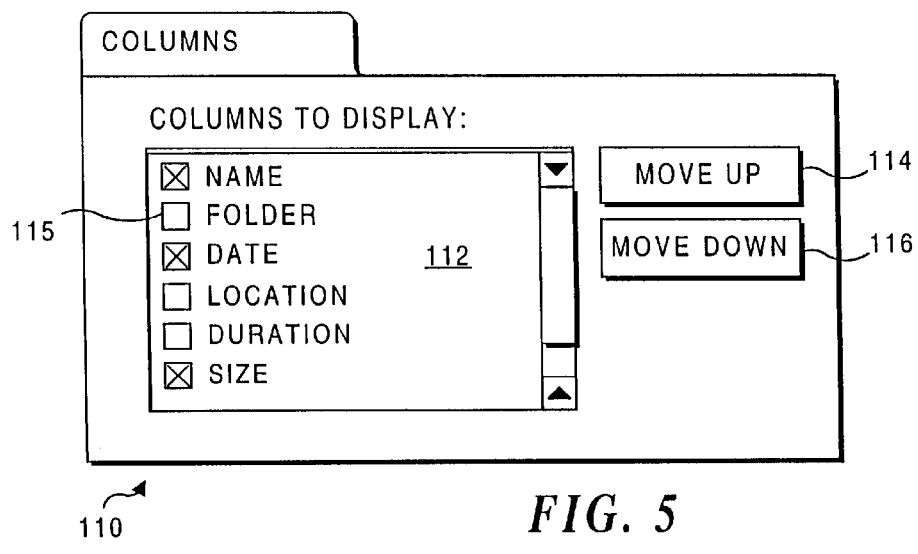
FIG. 5 is an option dialog box for selecting the fields that will be employed for displaying information regarding the sound files recorded on the hand held computer.

Referring now to FIG. 5, a dialog box 110 illustrates the options available in the user interface that relate to the record and playback functions. In this particular dialog box, the user can select the columns that will be displayed when the list of recorded notes or files is provided (as shown in the example discussed above in connection with FIG. 4). A list box 112 includes each of the columns that can be displayed and includes check boxes 115 in which the user can selectively indicate the columns that will be included when the files are displayed. The relative position of a selected column entry in the display can be changed by using a "move up" control 114, or a "move down" control 116.

Figure 6:
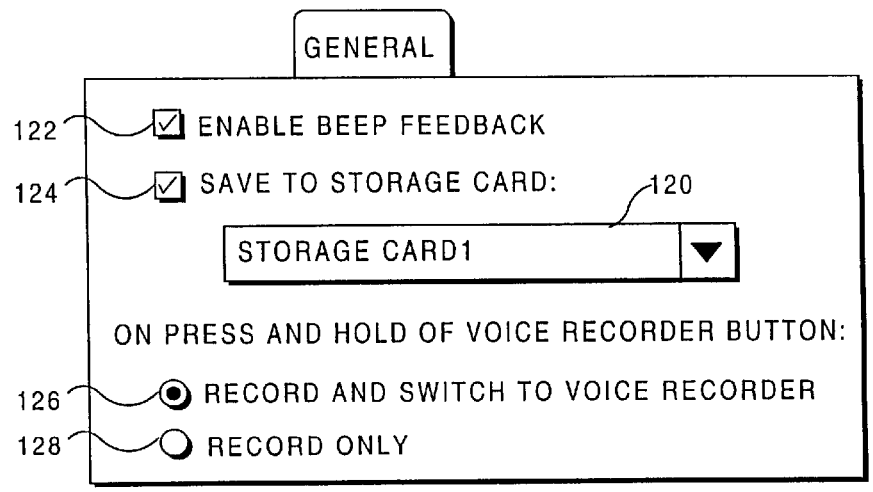
FIG. 6 is a dialog box listing options for controlling the operation of the hand held computer and the saving of sound files on the PCMCIA card (or in memory)

FIG. 6 illustrates a dialog box 118 that is provided to enable the user to set general options in regard to controlling the recording of sound files. In this dialog box, a check box 122 can be checked to enable a "beep feedback" when playing and recording sound files. If not checked, the audible beep is no longer used during record and playback functions. A check box 124 can be checked to indicate that the user wishes to save recorded files to a PCMCIA storage card. A drop-down list box 120 enables the user to identify the name of the particular storage card that such notes are to be saved to. If the indicated storage card is not inserted into the hand held digital computer, the files are instead saved to the memory (e.g., memory 28 in FIG. 1A).

There are two possible options that the user can choose by selecting a radio button 126 or a radio button 128. These options determine the action of the hand held digital computing device when record button 20 (referred to here as the "voice recorder button") is pressed and held. If radio button 126 is checked, pressing and holding the voice recorder button starts the recording and launches the voice recording application so that record/play toolbar 50 (shown in FIG. 2) appears on the user interface. However, if radio button 128 is selected, pressing and holding the voice recorder button immediately starts the recording, but the voice recording application or toolbar is not brought to the foreground on touch screen display 18.

Flow Charts for Recording and Playing Sound Files

Figure 8:
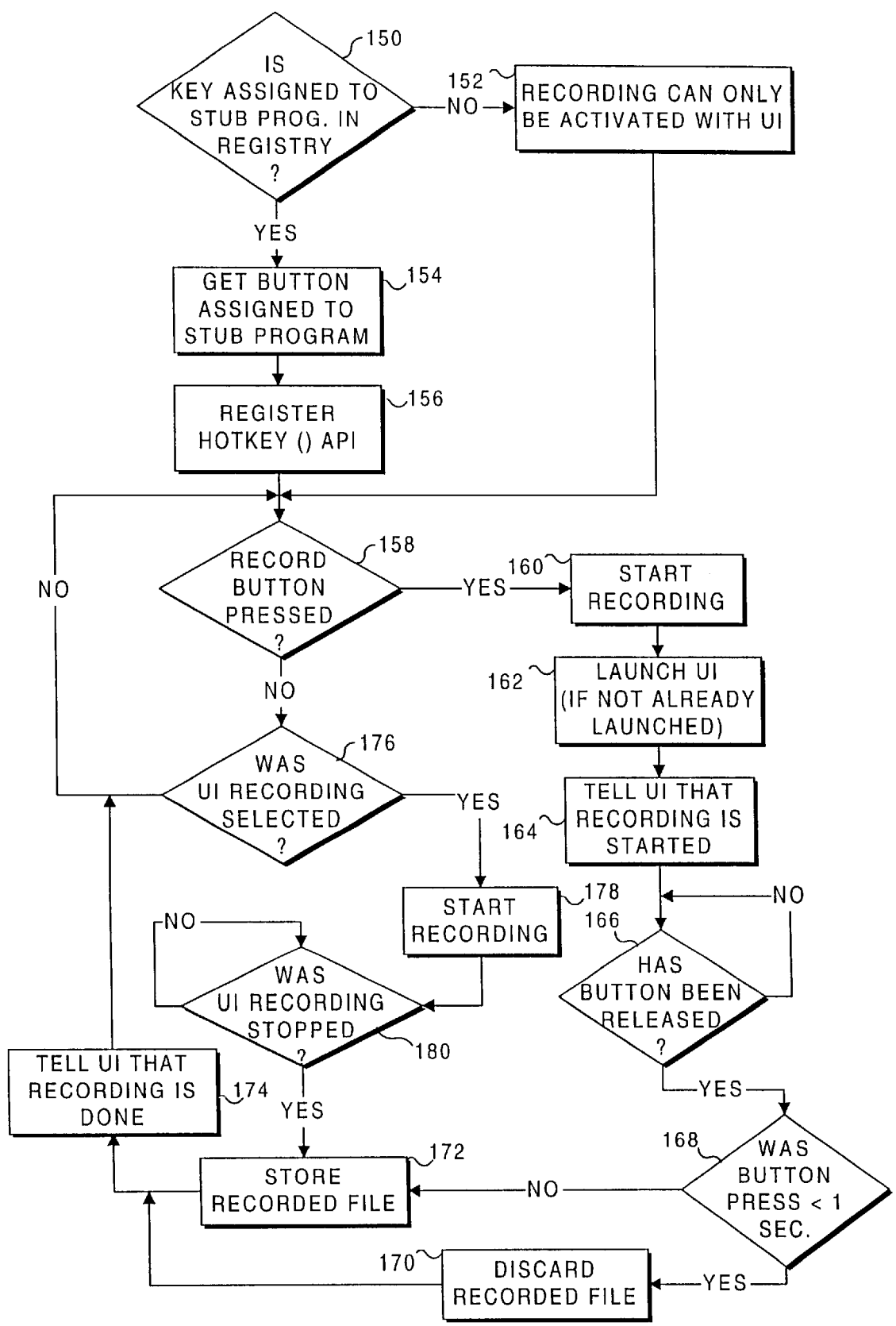
FIG. 8 is a flow chart illustrating the logical steps implemented during the recording of sound on the hand held computer.

Further details related to the logic employed for using record button 20 to immediately start the recording of a memo or note are shown in FIG. 8. In a decision block 150, a determination is made as to whether any control button, e.g., record button 20, has been assigned to the stub program in the registry of the operating system. In the preferred embodiment, the hand held digital computing device employs Microsoft Corporation's WINDOWS CE operating system, which uses a registry for defining the functionality of hardware and software components employed on the device. It is contemplated that in some instances, the user may be provided the option of assigning a different control button to the stub program in the registry (or selecting a different application that will be immediately started when the selected control button is actuated). If the results in decision block 150 is negative, a block 152 indicates that sound recording can only be activated with the user interface. For example, the user can elect a menu option that brings up record/play toolbar 50, as discussed above. However, if a control button has been assigned to the stub program in the registry, a block 154 provides for getting the control button that is assigned. Next, a block 156 provides for registering the control button using an application programming interface (API) referred to as the "HOT KEY( ) API." (See the description of this API below.)

Following either block 152 or block 156, a decision block 158 determines if the record control button that has been assigned to the stub program was pressed. If it was, a block 160 immediately starts the recording process, activating the input of digital information from the A/D converter coupled to microphone 30. This digital signal is compressed in real time and retained in memory as the recording process continues. A block 162 launches the user interface, assuming that it has not already been launched. Further, as indicated in a block 164, the stub program tells the user interface that a sound recording has been started.

A decision block 166 then determines if the record control button has been released. If not, the logic loops back until the control button is released. Once the record control button, e.g., record button 20 has been released, a decision block 168 determines if the control button had been pressed for less than one second. If the record control button was pressed for less than a second, the recorded file being stored in the memory is discarded, as provided in a block 170. However, if the record control button has been pressed for one second or more, a block 172 stores the recorded file, either in memory 28, or on the PCMCIA card designated by the user, as noted above, assuming that the PC card is present in the hand held digital computing device. Following either blocks 170 or 172, a block 174 tells the user interface that the recording is completed for the file, since the sound file has either been discarded or stored. Thereafter, the logic returns to decision block 158 to wait until the record control button is pressed. Alternatively, as indicated by the OR linking decision block 158 with a decision block 176, a determination is made (while waiting for the record control button to be pressed) of whether the user interface recording mode had been selected by the user touching the record control on record/play toolbar 50. If so, a block 178 provides for starting the recording. Recording continues, as indicated by a decision block 180, until stopped by using the stop button (or by filling all available memory). If the user interface initiated recording is stopped, the logic again proceeds to store the recorded file in block 172. Based on this logic, it will be apparent that either of the two optional techniques can be used for starting a recording. More importantly however, a user can immediately start recording by depressing the record control button, assuming that it has been assigned to the stub program in the registry. Alternatively, the user has the option of employing the user interface voice record/play toolbar to initiate the recording. By simply quickly depressing the voice record control button and releasing it, the user can selectively launch the user interface, enabling the record/play toolbar to be displayed and thereby using that option for initiating and controlling the recording and playback of sound files.

Figure 9:
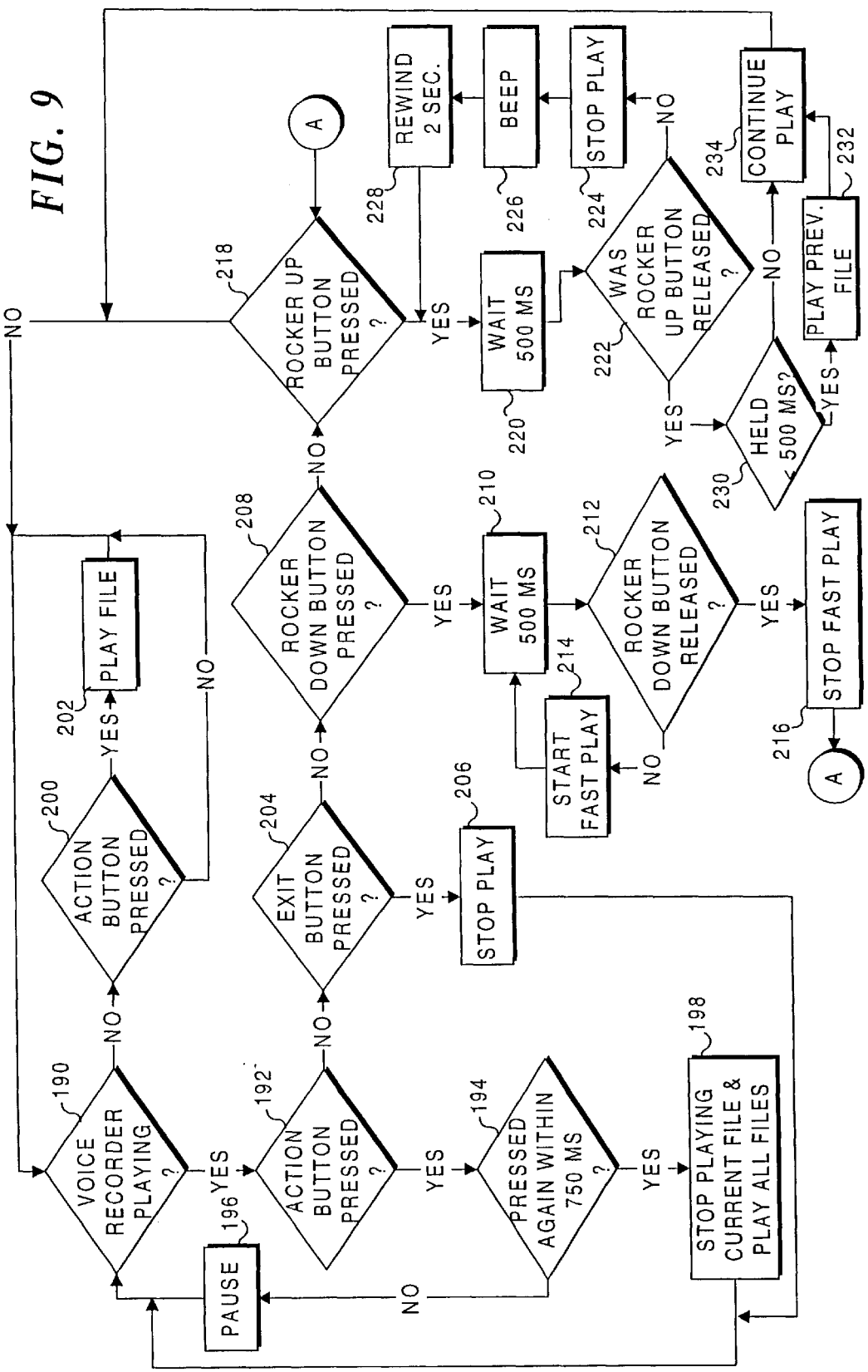
FIG. 9 is a flow chart illustrating the logical steps for playing back a previously recorded sound file or note on the hand held computer.

FIG. 9 illustrates the logic employed for controlling the play of a sound file previously recorded. The logic begins at a decision block 190, which determines if the voice recorder is playing. If it is, a decision block 192 determines if the record button was pressed. If so, a decision block 194 determines if the button was pressed again within 750 milliseconds, which constitutes a double click on the record button. If so, a block 198 provides that the current file being played stops playing, and then the logic proceeds to begin playing all of the sound files in sequence, beginning with the first file in the list. The logic then returns to decision block 190. However, a negative response to decision block 194 indicates that the record button was pressed again after 750 milliseconds had elapsed between its previous press, so that the second press initiates a pause of the current sound file that is being played back, as generally indicated in a block 196. After block 196, the logic again returns to decision block 190.

A negative response to decision block 190, which occurs when the voice recorder is not currently playing, leads to a decision block 200, which determines if the record button was pressed. If so, a block 202 plays the sound file currently selected. The logic then loops back to decision block 190. Thus, if the user had paused the current sound file by pressing the record button more than 750 milliseconds after it was previously pressed, play is again resumed by pressing the record button again, as indicated in decision block 200 and block 202. A negative result in decision block 200 also returns to decision block 190.

A negative response to decision block 192, indicating that the record button was not pressed while the voice recorder is playing, leads to a decision block 204, which determines if the exit button had been pressed. If so, a block 206 immediately stops playing the current file. Thereafter, the logic again returns to decision block 190. However, a negative response to decision block 204 leads to a decision block 208. In this decision block, the logic determines if the rocker down button has been pressed. If so, a block 210 provides for waiting 500 milliseconds. Next, a decision block 212 determines if the rocker down button was released and if not, starts fast play as indicated in a block 214. The logic then returns to block 210 to wait another 500 milliseconds. Thus, so long as the rocker down button is held depressed, fast play of the recorded file continues and at 500 millisecond intervals, the logic checks to determine if the rocker down button has been released. If it has, a block 216 provides for stopping the fast play. Thereafter, the logic proceeds to a decision block 218. Decision block 218 is also reached if the results in decision block 208 are negative, i.e., if the rocker down button had not been pressed. Decision block 218 determines if the rocker up button has been pressed. If so, the program waits for 500 milliseconds as indicated in a block 220, and then determines if the rocker up button has been released in a decision block 222. If so, a decision block 230 determines if the rocker up button had been held for less than 500 milliseconds. A positive response leads to a block 232 in which the logic causes the previous file (if any) in the list to be played. This file continues playing, as indicated in a block 234. Block 234 is also reached from decision block 230 if the rocker up button had been held for more than 500 milliseconds. Thus, decision block 230 determines if the rocker up button was simply tapped, and if so, plays the previous file. If not, the current file continues playing. The logic loops back to decision block 190. A negative response to decision block 222 leads to a block 224 in which the play of the current file is stopped. An audible beep signal is then provided through the speaker of the hand held digital computing device to indicate that the logic is about to rewind the current file. A block 228 then provides for rewinding through two seconds of real time recording, which corresponds to 500 milliseconds of rewind time, since the rewind occurs at high speed. The logic then loops back to block 220, to wait 500 milliseconds while the rewind occurs. Again, decision block 222 determines if the rocker up button was released. If not, the loop again repeats to rewind an additional two seconds of real time recording. Once the button is released, a negative result in decision block 230 will continue play from the current point in the sound file that was reached by the rewind operation.

Although the activation of voice recording is disclosed as a function that is implemented in response to the record button being pressed, it should be apparent that other functions could equally well be activated by any of the hardware control buttons provided on the hand held digital computer. All that is required is to associate the appropriate control button with the function that is to be actuated in the registry of the operating system.

Description of RegisterHotKev( ) API

The RegisterHotKey( ) API defines a system-wide hot key in accord with the following:

```
BOOL RegisterHotKey(
HWND hWnd,         // window to receive hot-key notification
int id,            // identifier of hot key
UINT fsModifiers,  // key-modifier flags
UINT vk            // virtual-key code
);
Parameters
hWnd
```

Identifies the window that will receive WM_HOTKEY messages generated by the hot key. If this parameter is NULL, WM_HOTKEY messages are posted to the message queue of the calling thread and must be processed in the message loop.
id Specifies the identifier of the hot key. No other hot key in the calling thread should have the same identifier. An application must specify a value in the range 0×0000 through 0×BFFF. A shared dynamic-link library (DLL) must specify a value in the range 0×C000 through 0×FFFF (the range returned by the GlobalAddAtom function). To avoid conflicts with hot-key identifiers defined by other shared DLLs, a DLL should use the GlobalAddAtom function to obtain the hot-key identifier.
fsModifiers Specifies keys that must be pressed in combination with the key specified by the nVirtKey parameter in order to generate the WM_HOTKEY message. The fsModifiers parameter can be a combination of the following values:

| Value | Meaning |
| --- | --- |
| MOD_ALT | Either ALT key must be held down. |
| MOD_CONTROL | Either CTRL key must be held down. |
| MOD_SHIFT | Either SHIFT key must be held down. |

Specifies the virtual-key code of the hot key.
Return Values:
If the function succeeds, the return value is nonzero.
If the function fails, the return value is zero.
Remarks about the API:
When a key is pressed, the system looks for a match against all hot keys. Upon finding a match, the system posts the WM_HOTKEY message to the message queue of the thread that registered the hot key. This message is posted to the beginning of the queue so it is removed by the next iteration of the message loop.

This function cannot associate a hot key with a window created by another thread.

RegisterHotKey fails if the keystrokes specified for the hot key have already been registered by another hot key.

If the window identified by the hWnd parameter already registered a hot key with the same identifier as that specified by the id parameter, the new values for the fsModifiers and vk parameters replace the previously specified values for these parameters.

WindowsCE additions:
The hwnd parameter may not be NULL.
There is no restriction on the id parameter.
There is a new MOD_KEYUP flag which can be passed in. If passed in, the window will be sent a WM_HOTKEY message on key up in addition to on key down.
For messages being sent on a keyup, the modifier in the loword of the lparam of the WM_HOTKEY message will have the MOD_KEYUP flag set.

Applications that do not pass in this new flag while registering their hotkey will only be sent the WM_HOTKEY message on keydown events—this is the windows compatible mode of using this API.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A digital computing device that immediately implements a predefined function in response to a user action, independent of whether an operating system is currently running on the digital computing device, comprising:
   (a) a power supply for providing electrical power to energize the digital computing device;
   (b) a memory for storing machine instructions;
   (c) a switch disposed on a housing; and
   (d) a processor, coupled to the memory and to the switch, for executing the machine instructions to carry out a plurality of functions, a portion of said machine instructions comprising a stub program that runs until the power supply is de-energized, and another portion of the machine instructions comprising the operating system that is substantially larger than and independent of the stub program and which is selectively executed by the processor to provide a main user interface implemented by the operating system and to provide access to hardware resources for selectively loaded application programs, said stub program immediately responding to a user actuating the switch by implementing the predefined function independent of and not under control of the operating system, even before the operating system is run and the main user interface is thus not currently available, said predefined function being unrelated to initiating the operating system.

2. The digital computing device of claim 1, wherein, if the operating system is not yet running, the stub program causes the processor to launch the operating system after implementing the predefined function in response to the user actuating the switch.

3. The digital computing device of claim 1, further comprising:
   (a) a microphone that produces an analog signal corresponding to sound waves that are incident on the microphone; and
   (b) an analog-to-digital converter coupled to the microphone and to the memory, said analog-to-digital converter converting the analog signal produced by the microphone into a digital signal that is stored in the memory, wherein the predefined function comprises storing the digital signal from the analog-to-digital converter in the memory to record the sound waves incident on the microphone.

4. The digital computing device of claim 3, wherein the stub program is adapted to cause the processor to at least temporarily store the digital signal in the memory until the user stops actuating the switch.

5. The digital computing device of claim 4, wherein the stub program causes the processor not to save the digital signal at least temporarily stored in the memory if the user continuously actuates the switch for less than a predefined interval.

6. The digital computing device of claim 5, wherein the stub program causes the processor to launch the operating system if the user continuously actuates the switch for less than the predefined interval.

7. The digital computing device of claim 3, wherein the stub program further compresses the digital signal and saves the digital signal in the memory in a compressed format.

8. The digital computing device of claim 3, further comprising:
   (a) a sound transducer that produces audible sounds in response to an applied analog signal; and
   (b) a digital-to-analog converter that is coupled to the memory to receive the digital signal stored therein and to the sound transducer to provide the applied analog signal, said applied analog signal corresponding to the digital signal, so that said sound transducer produces audible sounds corresponding to the digital signal to play back sounds substantially reproducing the sound waves that were incident on the microphone.

9. The digital computing device of claim 8, wherein the operating system includes functions for controlling the playback of the digital signal stored in the memory.

10. The digital computing device of claim 9, further comprising a plurality of controls adapted to be actuated by the user, at least one of said plurality of controls initiating the playback of the digital signal stored in the memory to produce the audible sounds with the sound transducer.

11. The digital computing device of claim 10, wherein one of the plurality of controls is adapted to cause the playback of the digital signal at a speed substantially greater than a rate at which the digital signal was provided to the memory by the analog-to-digital converter.

12. The digital computing device of claim 10, wherein another of the plurality of controls is adapted to rewind through the digital signal stored in the memory.

13. The digital computing device of claim 12, wherein while rewinding the digital signal, audible tones are produced by the sound transducer at periodic intervals of time to represent durations of successive portions of the digital signal being rewound.

14. The digital computing device of claim 10, wherein the machine instructions cause the processor to store the digital signal as a file, in a folder specified by the user.

15. The digital computing device of claim 14, wherein one of the plurality of controls, if actuated for less than a minimum predefined interval of time during playback of the digital signal in one file, causes a digital signal in a next file to be played, and if said one control is actuated for more than the minimum predefined interval of time, is adapted to cause the playback of the digital signal currently being played at a speed substantially greater than a rate at which the digital signal was provided to the memory by the analog-to-digital converter.

16. The digital computing device of claim 14, wherein one of the plurality of controls, if actuated for less than a minimum predefined interval of time during playback of the digital signal in one file, causes a digital signal in a previous file to be played, and if said one control is actuated for more than the minimum predefined interval of time, is adapted to rewind through said one digital signal currently being played.

17. The digital computing device of claim 14, wherein the machine instructions cause the processor to enable the user to identify the folder by selecting it from a plurality of folders.

18. The digital computing device of claim 14, further comprising a data port adapted for transmitting the file to another computing device.

19. The digital computing device of claim 3, wherein the machine instructions cause the processor to enable the user to record sound with the microphone, for inclusion in an e-mail message.

20. A method for immediately implementing a predefined function in response to a user action on a digital computing device, independent of whether a main user interface of a general purpose operating system is currently running on the digital computing device, comprising the steps of:
   (a) executing a stub program that runs while the digital computing device is energized, the separate general purpose operating system that provides the main user interface not being required to execute before the stub program is run;
   (b) providing a switch on the digital computing device;
   (c) associating the stub program with the switch; and
   (d) immediately responding to a user actuating the switch by implementing the predefined function independent of and not under control of the general purpose operating system, even when the general purpose operating system is not currently running and the main user interface is thus not currently available, said predefined function being initiated by the stub program without a delay that is required to launch the main user interface and being unrelated to initiating the general purpose operating system.

21. The method of claim 20, further comprising the step of launching the general purpose operating system after implementing the predefined function in response to the user actuating the switch, if the general purpose operating system is not already running.

22. The method of claim 20, further comprising the step of providing a microphone on the digital computing device, wherein the predefined function comprises storing a digital signal corresponding to sound waves incident on a microphone.

23. The method of claim 22, wherein the digital signal is at least temporarily stored by the stub program until the user stops actuating the switch.

24. The method of claim 23, further comprising the step of discarding the digital signal if the user continuously actuates the switch for less than a predefined interval.

25. The method of claim 23, wherein the stub program launches the general purpose operating system if the user continuously actuates the switch for less than the predefined interval.

26. The method of claim 23, further comprising the step of initiating playback of the digital signal stored in the memory to produce the audible sounds.

27. The method of claim 26, further comprising the step of selectively causing the playback of the digital signal at a speed substantially greater than a rate at which the digital signal was saved.

28. The method of claim 26, further comprising the step of selectively rewinding back through the digital signal during its playback.

29. The method of claim 28, further comprising the step of producing audible tones at periodic intervals of time, to represent durations of successive portions of the digital signal being rewound.

30. The method of claim 22, further comprising the step of enabling the user to record spoken words for inclusion in a message.

31. The method of claim 22, further comprising the steps of:

(a) compressing the digital signal; and (b) saving the digital signal in a compressed format.

32. The method of claim 22, further comprising the step of producing audible sounds corresponding to the digital signal that was stored, thereby substantially reproducing the sound waves that were incident on the microphone.

33. The method of claim 20, further comprising the step of storing the digital signal as a file in a folder specified by the user.

34. The method of claim 33, further comprising the step of providing a control, which if actuated for less than a minimum predefined interval of time during playback of the digital signal in one file, causes a digital signal in a next file to be played, and if actuated for more than the minimum predefined interval of time, causes playback of the digital signal currently being played at a fast forward speed.

35. The method of claim 33, further comprising the step of providing a control, which if actuated for less than a minimum predefined interval of time during playback of the digital signal in one file, causes a digital signal in a previous file to be played, and which if actuated for more than the minimum predefined interval of time, rewinds through said one digital signal currently being played at a rewind speed.

36. The method of claim 33, further comprising the step of enabling the user to selectively identify the folder from a list of a plurality of folders.

37. The method of claim 33, further comprising the step of transmitting the file to another computing device.

38. The method of claim 33, further comprising the step of enabling the user to play a selected file in which the digital signal is stored.

39. The method of claim 38, further comprising the step of enabling the user to selectively play all files in a selected folder by double clicking the switch.

40. The method of claim 22, further comprising the step of providing functions for controlling the playback of the digital signal that was stored.

41. A method of communicating between a control on a digital computing device and a process for recording input data, comprising the steps of:

(a) assigning the control to a stub program executing on the digital computing device, as a registry entry;

(b) executing the stub program that monitors the control, said stub program running independently of and not under control of an operating system that produces a user interface and without regard for initiating the operating system; and (c) responding to a user actuating the control by passing a fast_keypress_notification to the stub program, to immediately initiate recording of the input data independent of the operating system.

42. A digital computing device that immediately implements a predefined function in response to a user action, independent of whether an operating system is currently running on the digital computing device, comprising:

(a) a power supply for providing electrical power to energize the digital computing device;

(b) a processor for executing machine instructions;

(c) a switch coupled to the processor and disposed on a housing; and (d) a memory coupled to the processor and storing the machine instructions that cause the processor to carry out a plurality of functions, said machine instructions comprising:

(i) the operating system, which is selectively executed by the processor to provide a main user interface upon execution of the operating system; and (ii) a stub program that is independent of and not under control of the operating system and which runs until the power supply is de-energized, said stub program being associated with the switch so as to immediately respond to a user actuating the switch by implementing the predefined function independent of the operating system being notified that the switch was activated, and even before the operating system is executed, so that the main user interface is not currently available, said predefined function being unrelated to initiating the operating system and unrelated to initiating an application program that runs under control of the operating system.

43. The digital computing device of claim 42, wherein the stub program is predefined to be associated with the switch by a registry entry stored in the memory.

44. The digital computing device of claim 42, further comprising a second switch, wherein the stub program is executed upon activation of the switch without activation of the operating system and without a determination that the second switch was not activated.

45. The digital computing device of claim 42, further comprising:

(a) a sound transducer; and (b) an analog-to-digital transducer in communication with the sound transducer, the memory, and the processor, wherein the predefined function comprises storing in the memory a sound incident on the sound transducer and converted from an analog signal to a digital signal by the analog-to-digital converter.

\* \* \* \* \*